(12) United States Patent
Chir

(10) Patent No.: US 9,088,154 B2
(45) Date of Patent: Jul. 21, 2015

(54) TURBINE ARRAY AND A METHOD OF CONTROLLING A TURBINE ARRAY DURING A LOSS-OF-GRID EVENT

(75) Inventor: Adam P Chir, Derby (GB)

(73) Assignee: ROLLS-ROYCE plc, London (GB)

( * ) Notice: Subject to any disclaimer, the term of this patent is extended or adjusted under 35 U.S.C. 154(b) by 73 days.

(21) Appl. No.: 14/115,420

(22) PCT Filed: Apr. 18, 2012

(86) PCT No.: PCT/EP2012/057033
§ 371 (c)(1),
(2), (4) Date: Nov. 18, 2013

(87) PCT Pub. No.: WO2012/150128
PCT Pub. Date: Nov. 8, 2012

(65) Prior Publication Data
US 2014/0077772 A1   Mar. 20, 2014

(30) Foreign Application Priority Data
May 4, 2011   (GB) .................................. 1107329.3

(51) Int. Cl.
| H02P 3/00 | (2006.01) |
| H02P 9/06 | (2006.01) |
| H02P 15/00 | (2006.01) |
| H02H 7/06 | (2006.01) |
| F03B 13/26 | (2006.01) |
| F03D 9/00 | (2006.01) |
| H02P 9/04 | (2006.01) |
| G05D 3/12 | (2006.01) |

(52) U.S. Cl.
CPC .............. *H02H 7/067* (2013.01); *F03B 13/264* (2013.01); *F03B 13/268* (2013.01); *H02P 9/04* (2013.01); *F05B 2270/1071* (2013.01); *Y02E 10/28* (2013.01)

(58) Field of Classification Search
USPC ......................... 322/15; 290/44; 700/287, 295
See application file for complete search history.

(56) References Cited

U.S. PATENT DOCUMENTS

| 4,804,855 A | 2/1989 | Obermeyer |
| 6,336,322 B1 | 1/2002 | Kuwabara et al. |
| 7,075,189 B2 * | 7/2006 | Heronemus et al. ............ 290/44 |
| 7,920,942 B2 * | 4/2011 | Lasseter et al. ............... 700/286 |

(Continued)

FOREIGN PATENT DOCUMENTS

| EP | 1 925 817 A2 | 5/2008 |
| WO | WO 2009/111861 A1 | 9/2009 |

OTHER PUBLICATIONS

Aug. 31, 2011 British Search Report issued in British Application No. 1107329.3.

(Continued)

*Primary Examiner* — Pedro J Cuevas
(74) *Attorney, Agent, or Firm* — Oliff PLC

(57) ABSTRACT

A turbine array including: a plurality of turbines; an electrical machine connected to each of the turbines and to an electrical grid; wherein at least one of the electrical machines is a motor-generator which can operate in a motor mode or a generator mode, and wherein the other electrical machines are generators; and a controller for detecting a loss-of-grid event; wherein the controller sets the motor-generator to the motor mode when a loss-of-grid event is detected, the motor-generator being driven by the generators and thereby providing a load to the generators.

11 Claims, 2 Drawing Sheets

(56) References Cited

U.S. PATENT DOCUMENTS

| | | | |
|---|---|---|---|
| 8,000,840 B2* | 8/2011 | Nielsen | 700/286 |
| 8,183,714 B2* | 5/2012 | McDonnell | 307/82 |
| 8,853,876 B1* | 10/2014 | Wagoner et al. | 290/44 |
| 8,946,917 B2* | 2/2015 | Holmberg et al. | 290/44 |
| 2003/0168864 A1* | 9/2003 | Heronemus et al. | 290/55 |
| 2006/0034692 A1 | 2/2006 | Grabau | |
| 2008/0071427 A1* | 3/2008 | Szepek et al. | 700/287 |
| 2008/0284172 A1* | 11/2008 | Nielsen | 290/44 |
| 2009/0326724 A1* | 12/2009 | Lasseter et al. | 700/287 |
| 2010/0140939 A1 | 6/2010 | Scholte-Wassink et al. | |
| 2010/0292852 A1* | 11/2010 | Gertmar et al. | 700/287 |
| 2010/0292853 A1* | 11/2010 | McDonnell | 700/287 |
| 2011/0309683 A1* | 12/2011 | Nielsen | 307/84 |
| 2012/0146423 A1* | 6/2012 | Bodewes et al. | 307/84 |
| 2012/0200155 A1* | 8/2012 | McDonnell | 307/18 |
| 2012/0283890 A1* | 11/2012 | Fu et al. | 700/295 |
| 2014/0025217 A1* | 1/2014 | Jin et al. | 700/295 |
| 2014/0191507 A1* | 7/2014 | Holmberg et al. | 290/44 |
| 2014/0286776 A1* | 9/2014 | Gao et al. | 416/155 |
| 2014/0312620 A1* | 10/2014 | Korber et al. | 290/44 |
| 2014/0319838 A1* | 10/2014 | Wagoner et al. | 290/44 |
| 2015/0076823 A1* | 3/2015 | Ali et al. | 290/44 |
| 2015/0084338 A1* | 3/2015 | Tarnowski | 290/44 |

OTHER PUBLICATIONS

Oct. 26, 2012 International Search Report issued in International Application No. PCT/EP2012/057033.

* cited by examiner

TURBINE ARRAY AND A METHOD OF CONTROLLING A TURBINE ARRAY DURING A LOSS-OF-GRID EVENT

The present invention relates to a turbine array and a method of controlling the array during a loss-of-grid event, and particularly but not exclusively, to such an apparatus and method which prevent overspeeding of the turbines during a loss-of-grid event.

BACKGROUND

Tidal power harnesses the natural energy produced by the periodic rise and fall of the sea. These tides are created by the rotation of the Earth in the presence of the gravitational fields of the Sun and Moon.

Various methods may be employed to convert the energy of the tides into useful power. These methods broadly fall into two categories: tidal stream systems and tidal barrages.

Tidal stream systems operate in a similar manner to wind turbines and usually consist of a turbine which is rotated by the tidal current.

With a tidal barrage, water is allowed to flow into the area behind the barrage (for example, an estuary) through sluice gates during the flood tide. At high tide, the sluice gates are closed. Since the sea level falls during ebb tide, a head of water is created behind the barrage. Once the head of stored water is of sufficient height, the sluice gates are opened and the stored water is directed to flow through turbines housed within the barrage, thus converting the potential energy stored in the water into useful power.

A tidal barrage is in use on the Rance river in France. The Rance tidal barrage use 24 turbines, each capable of outputting 10 Megawatts of power. The turbines are low-head bulb turbines which capture energy from the 8 metre tidal range of the river using a 22.5 $km^2$ basin.

FIG. 1 shows a cross-section through a tidal barrage as used on the Rance river.

The tidal barrage separates an upstream side 102 and a downstream side 104. A passage is formed through the barrage in which a bulb turbine 106 is positioned. The flow of water through the passage and turbine 106 is controlled by first and second turbine gates 108, 110 located at either end of the passage.

The turbine 106 comprises a generator 112 at an upstream end of the turbine 106. The generator 112 is positioned centrally in the turbine 106 and water is forced to flow around the outside of the generator 112 over a set of stationary guide vanes 114 to a rotor 116. The rotor 116 is rotatably coupled to the generator 112 and comprises a plurality of blades. The blades of the rotor 116 have a hydrofoil cross-section which creates torque and rotates the rotor 116 when water flows past the rotor 116. This turns the generator 112 and thus produces useful power.

The turbines used in the Rance tidal barrage were intended for bidirectional operation (i.e. dual generation where power is generated on both ebb and flood tides). However, the low efficiency of the turbines during flood tide has meant that the turbines have only been used for ebb generation.

An electrical grid transmits the electrical energy from the generator 112 of the turbine 106 to electricity customers. The electrical grid provides an electrical load to the turbine 106 and generator 112 which imposes a torque on the rotor 116 of the generator 112. The torque controls the rotation of the rotor 116 and prevents overspeeding.

In the event of a disconnection from the grid (a loss-of-grid event), the grid load is lost, resulting in a loss of torque on the generator 112. This loss of torque can lead to a large acceleration of the turbine 106 which is limited only by hydrofoil drag. Such overspeeding can cause damage to the turbine 106 and generator 112, particularly bearings, drive train components and the rotor blades themselves, and also to the surrounding structure.

The turbine gates 108, 110 may be closed to prevent overspeeding of the turbine 106 and generator 112 during a loss-of-grid event. Typically, sluice gates (not shown) in the barrage are opened to enable water to bypass the turbines 106 and to flow through the barrage. This prevents the head of water from exceeding the safe working limits of the barrage and avoids overtopping where the water overturns the barrage structure.

With a dual generation barrage the differential head of water against the barrage is low enough that entry, through duct and exit losses are substantial and a large number of turbines are required to provide a highly porous structure in which these losses are minimised. The high percentage of turbine swept area results in there being no additional area available for the provision of sluice gates. The barrage is designed such that structure is capable of withstanding a differential head substantially less than the full tidal range of the estuary. Accordingly, closure of the gates across each turbine may result in an unacceptably large head building across the barrage. This head of water may exceed the safe working limits of the barrage and thus is undesirable.

An alternative strategy frequently used is to adjust the pitch of the rotor blades, so as to reduce the speed of the turbines. However, this results in a sudden increase in flow through the barrage, causing a wave. The wave may proceed up through the estuary and can impact upon the inland environment. Furthermore, the installation will not be able to resume generation until the next tidal cycle.

The present invention seeks to provide a turbine array which mitigates against a loss-of-grid event whilst addressing some or all of the above identified problems.

STATEMENTS OF INVENTION

In accordance with an aspect of the invention there is provided a turbine array comprising: a plurality of turbines; an electrical machine connected to each of the turbines and to an electrical grid; wherein at least one of the electrical machines is a motor-generator which can operate in a motor mode or a generator mode, and wherein the other electrical machines are generators; and a controller for detecting a loss-of-grid event; wherein the controller sets the motor-generator to the motor mode when a loss-of-grid event is detected, the motor-generator being driven by the generators and thereby providing a load to the generators.

The motor-generator may be a generator which is configured to also operate as a motor.

The motor-generator may comprise a motor which is activated in the motor mode and a generator which is activated in the generator mode.

The controller may set the motor-generator to the motor mode by adjusting a blade pitch of the turbine. This allows power to be absorbed by increasing the head of water.

The turbines may be ganged together in banks, each bank containing at least one turbine with a motor-generator and at least one turbine with a generator.

Each bank may comprise a transformer which transforms the output of the bank.

The turbine array may further comprise one or more additional transformation stages comprising a transformer which transforms the output of a pair of transformers.

The turbine array may form a tree structure, and each branch of the tree structure may be provided with switchgear. Alternatively, only some of the branches may be provided with switchgear.

The other electrical machines may be motor-generators which can operate in a motor mode or a generator mode.

In accordance with another aspect of the invention there is provided a method of controlling a turbine array during a loss-of-grid event, the turbine array comprising: a plurality of turbines each connected to an electrical machine; wherein at least one of the electrical machines is a motor-generator which can operate in a motor mode or a generator mode, and wherein the other electrical machines are generators; the method comprising: detecting a loss-of-grid event; setting the motor-generator to the motor mode; and driving the motor-generator using the generators, thereby providing a load to the generators.

Setting the motor-generator to the motor mode may comprise adjusting a blade pitch of the turbine. This allows power to be absorbed by increasing the head of water.

The turbine array may be a tidal or tidal stream turbine array.

Although the turbines and electrical machines may experience a brief increase in speed caused by the loss-of-grid event, this may be mitigated by the load provided by the motor-generator operating in motor mode, and thus the speed returns to normal working speeds.

Once the electrical grid has been restored, the controller may reset the motor-generator to generator mode, so as to provide useful power to the electrical grid again.

The head across the barrage may therefore be maintained within safe limits by keeping the turbine gates open. The flow of water through the barrage may be approximately equivalent to the flow through the barrage under normal operating conditions. This mode of operation also prevents the production of a large tidal wave which may progress up the estuary.

The present invention may therefore prevent overtopping and may allow the installed barrage width to be reduced.

The present invention prevents turbine overspeed without requiring any additional equipment.

BRIEF DESCRIPTION OF THE DRAWINGS

For a better understanding of the present invention and to show more clearly how it may be carried into effect, reference will now be made, by way of example, to the accompanying drawings, in which.

DETAILED DESCRIPTION

Figure 1:
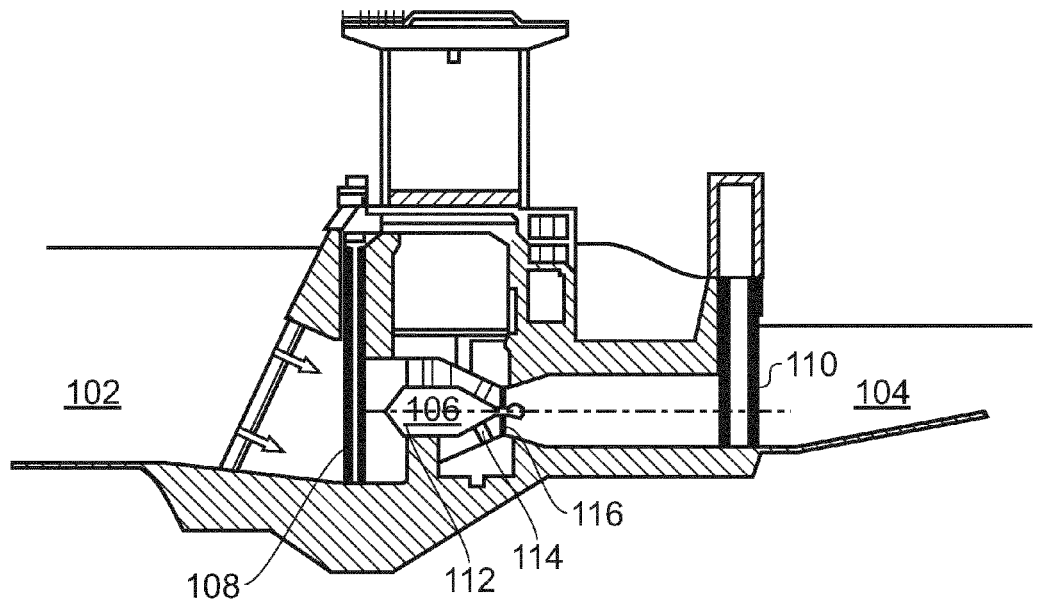
FIG. 1 is a cross-section through a tidal barrage as used on the Rance river comprising a prior art turbine.
Figure 2:
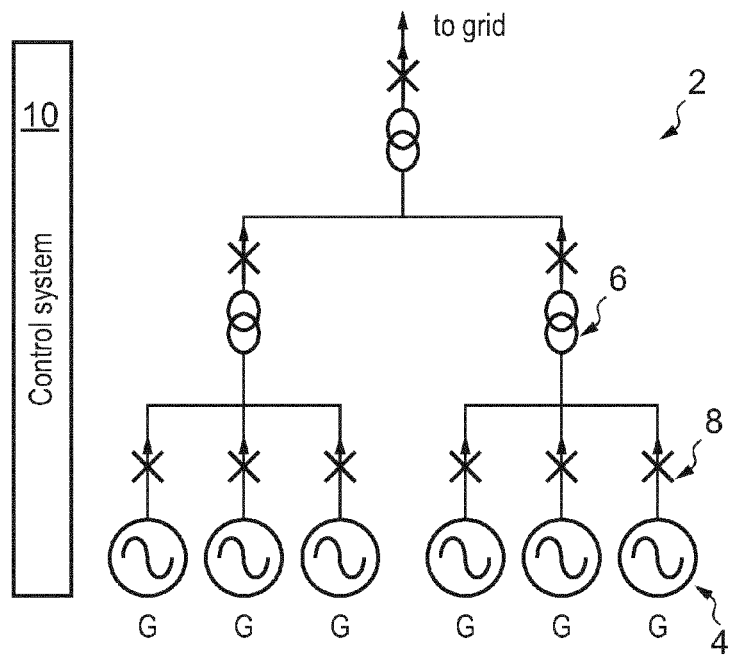
FIG. 2 is a schematic view of a tidal turbine array according to an embodiment of the invention during normal operating conditions.

With reference to FIG. 2, a tidal turbine array 2 according to an embodiment of the invention comprises a plurality of turbines. Each turbine is connected to an electrical machine. The electrical machines are motor-generators which are dual operation electrical machines that are capable of operating in either a motor mode or a generator mode. In the generator mode, the motor-generators are driven by the turbines, whereas in the motor mode, the motor-generators drive the turbines. The turbine and motor-generator units are shown schematically in FIG. 2 at 4.

The turbine and motor-generator units 4 are ganged together in banks of, for example, three units. Each of the banks of turbine and motor-generator units 4 are connected to a transformer 6. In a second transformation stage, a transformer 6 transforms the outputs of a pair of preceding transformers 6. The tidal turbine array 2 may contain any number of turbines and thus any number of transformation stages. Accordingly, the turbine and motor-generator units 4 and the transformers 6 form a tree structure, with a final transformer 6 of the tree structure providing a single output to an electrical grid. The electrical output of the individual turbines is transformed from an 11 kV generating voltage to the grid voltage of 400 kV via the various transformation stages.

Each branch of the tree is provided with switchgear 8 which can isolate the turbine and motor-generator units 4 from the transformers 6, and the transformers 6 from the transformers 6 of subsequent transformation stages.

The tidal turbine array 2 further comprises a controller 10. As will be described in further detail below, the controller 10 detects a loss-of-grid event and controls the operation of the turbine and motor-generator units 4.

FIG. 2 shows the tidal turbine array 2 under normal operating conditions. Here, all of the turbine and motor-generator units 4 are set to operate in generator mode (indicated by "G"). The turbine and motor-generator units 4 are driven by the potential energy of a head of water stored behind a barrage. The tidal turbine array 2 therefore provides power to the grid.

Figure 3:
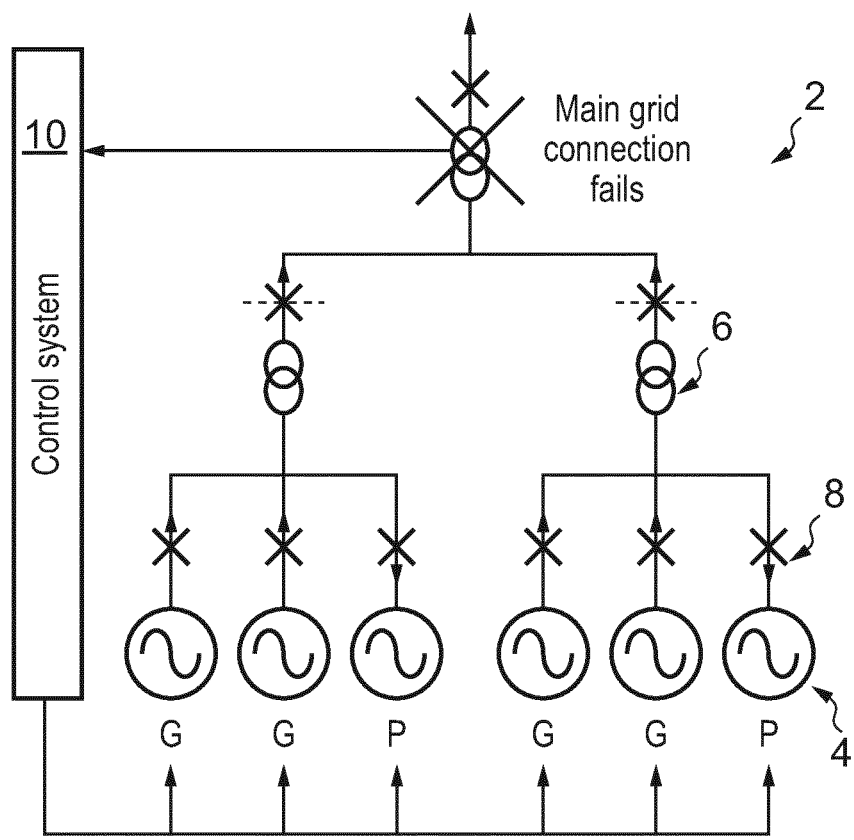
FIG. 3 is a schematic view of the tidal turbine array during a loss-of-grid event.

As shown in FIG. 3, the controller 10 detects a loss-of-grid event and controls the turbine and motor-generator units 4 to prevent overspeeding of the turbines. This is achieved by setting at least one motor-generator unit 4 in each bank to operate in a motor mode (i.e. by reversing the voltage across the motor-generator). Accordingly, the motor-generator operating in motor mode drives the turbine and effectively operates as a pump (indicated by "P"), opposing the flow of water through the barrage. The power for the motor-generator operating in motor mode is provided by the other turbine and motor-generator units 4 in the bank which are operating in generator mode. Consequently, the motor-generator operating in motor mode provides a load to the other motor-generators operating in generator mode, and thus prevents them from overspeeding.

Although the turbine and motor-generator units 4 may experience a brief increase in speed caused by the loss-of-grid event, this is mitigated by the load provided by the motor-generator operating in motor mode, and thus the speed returns to normal working speeds.

The turbines are variable-pitch turbines and thus the controller adjusts the pitch of the turbine blades in order to adapt the turbines to operate as pumps.

Once the electrical grid has been restored, the controller 10 may reset all of the motor-generators to generator mode and direct their output through the transformers 6, so as to provide useful power to the electrical grid again.

The head across the barrage may therefore be maintained within safe limits by keeping the turbine gates open and adjusting the operation of the turbine and motor-generator units 4 as described above, such that the flow of water through the barrage is approximately equivalent to the flow through the barrage under normal operating conditions. This mode of operation also prevents the production of a large tidal wave which may progress up the estuary.

Although the tidal turbine array has been described as using motor-generators, it is only necessary for at least one of the electrical machines to be able to operate as both a motor and a generator within each bank. The other electrical machines may operate exclusively as generators.

The invention claimed is:

1. A tidal or tidal stream turbine array comprising:
   a plurality of tidal or tidal stream turbines together creating a local grid;
   an electrical machine connected to each of the turbines and to an electrical grid; wherein at least one of the electrical machines is a motor-generator which can operate in a motor mode or a generator mode, and wherein the other electrical machines are generators; and
   a controller for detecting a loss-of-main-grid event;
   wherein the controller is configured to switch motor-generator to the motor mode when a loss-of-main-grid event is detected, the motor-generator being driven by the generators and thereby providing a load to the generators, thereby allowing the generators to drive the motor-generator via local grid power.

2. The tidal or tidal stream turbine array as claimed in claim 1, wherein the motor-generator is a generator which is configured to also operate as a motor.

3. The tidal or tidal stream turbine array as claimed in claim 1, wherein the motor-generator comprises a motor which is activated in the motor mode and a generator which is activated in the generator mode.

4. The tidal or tidal stream turbine array as claimed in claim 1, wherein the controller sets the motor-generator to the motor mode by adjusting a blade pitch of the turbine.

5. The tidal or tidal stream turbine array as claimed in claim 1, wherein the turbines are ganged together in banks, each bank containing at least one turbine with a motor-generator and at least one turbine with a generator.

6. The tidal or tidal stream turbine array as claimed in claim 5, wherein each bank comprises a transformer which transforms the output of the bank.

7. The tidal or tidal stream turbine array as claimed in claim 6, further comprising one or more additional transformation stages comprising a transformer which transforms the output of a pair of transformers.

8. The tidal or tidal stream turbine array as claimed in claim 6, wherein the turbine array forms a tree structure, each branch of the tree structure being provided with switchgear.

9. The tidal or tidal stream turbine array as claimed in claim 1, wherein the other electrical machines are motor-generators which can operate in a motor mode or a generator mode.

10. A method of controlling a tidal or tidal stream turbine array during a loss-of-main-grid event, the tidal or tidal stream turbine array comprising:
    a plurality of tidal or tidal stream turbines each connected to an electrical machine, the plurality of tidal or tidal stream turbines together creating a local grid;
    wherein at least one of the electrical machines is a motor-generator which can operate in a motor mode or a generator mode, and wherein the other electrical machines are generators;
    the method comprising:
    detecting the loss-of-main-grid event; and
    upon the detection of the loss-of-main-grid event:
       setting the motor-generator to the motor mode; and
       driving the motor-generator using the generators, thereby providing a load to the generators and allowing the generators to drive the motor-generator via local grid power.

11. A method as claimed in claim 10, wherein setting the motor-generator to the motor mode comprises adjusting a blade pitch of the turbine.

* * * * *